(12) United States Patent
Agrawal

(10) Patent No.: US 10,355,825 B2
(45) Date of Patent: Jul. 16, 2019

(54) SHARED SIGNALING CHANNEL FOR A COMMUNICATION SYSTEM

(75) Inventor: Avneesh Agrawal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1339 days.

(21) Appl. No.: 11/077,751

(22) Filed: Mar. 10, 2005

(65) Prior Publication Data

US 2006/0018347 A1 Jan. 26, 2006

Related U.S. Application Data

(60) Provisional application No. 60/590,125, filed on Jul. 21, 2004.

(51) Int. Cl.
*H04L 1/00* (2006.01)
*H04L 1/16* (2006.01)
(Continued)

(52) U.S. Cl.
CPC .......... *H04L 1/0072* (2013.01); *H04L 1/0002* (2013.01); *H04L 1/0041* (2013.01);
(Continued)

(58) Field of Classification Search
CPC .......... H04J 11/0026; H04L 5/0051; H04L 41/0803; H04L 67/306; H04W 4/50; H04W 64/00; H04H 20/423
(Continued)

(56) References Cited

U.S. PATENT DOCUMENTS 4,868,811 A * 9/1989 Suzuki .................... 370/436
6,507,572 B1 1/2003 Kumar et al.
(Continued)

FOREIGN PATENT DOCUMENTS

CN 1358356 7/2002
CN 1366748 8/2002
(Continued)

OTHER PUBLICATIONS

International Search Report—PCT/US2005/011237, International Search Authority—European Patent Office, dated Jul. 25, 2005.
(Continued)

*Primary Examiner* — Yemane Mesfin
*Assistant Examiner* — Mon Cheri S Davenport
(74) *Attorney, Agent, or Firm* — Dalei Dong; Arent Fox LLP

(57) ABSTRACT

A shared signaling channel has multiple segments, and parameters for this channel may or may not be sent to users in advance. For example, the number of segments, the size and rate of each segment, and so on may be broadcast to the users via an overhead channel. The transmit power for each segment is not broadcast to the users and can range from zero to the total transmit power. A base station obtains signaling for all terminals within its coverage and maps the signaling for each terminal to at least one segment used for the terminal, which may be dynamically selected. The base station processes (e.g., jointly or individually encodes) the signaling mapped to each segment and generates output data for the segment. The output data for each segment is multiplexed onto the system resources allocated for the segment and transmitted at the selected power level.

35 Claims, 10 Drawing Sheets

(51) Int. Cl.
    *H04W 52/32* (2009.01)
    *H04W 72/04* (2009.01)
    *H04L 1/12* (2006.01)
    *H04W 28/18* (2009.01)
    *H04W 28/20* (2009.01)
    *H04W 28/22* (2009.01)
    *H04W 52/34* (2009.01)
    *H04W 72/12* (2009.01)

(52) U.S. Cl.
    CPC ......... *H04L 1/1671* (2013.01); *H04W 52/322* (2013.01); *H04W 72/042* (2013.01); *H04L 1/0025* (2013.01); *H04L 1/0061* (2013.01); *H04L 2001/0093* (2013.01); *H04L 2001/125* (2013.01); *H04W 28/18* (2013.01); *H04W 28/20* (2013.01); *H04W 28/22* (2013.01); *H04W 52/346* (2013.01); *H04W 72/0473* (2013.01); *H04W 72/1273* (2013.01)

(58) Field of Classification Search
    USPC ........................................ 370/522, 527, 535
    See application file for complete search history.

(56) References Cited

U.S. PATENT DOCUMENTS

| | | | | |
|---|---|---|---|---|
| 6,928,062 | B2 * | 8/2005 | Krishnan | .............. H04L 1/0004 370/208 |
| 7,751,843 | B2 | 7/2010 | Butala | |
| 7,797,012 | B1 | 9/2010 | Longoni et al. | |
| 2002/0106033 | A1 | 8/2002 | Uesugi | |
| 2002/0159426 | A1 | 10/2002 | Kanemoto et al. | |
| 2003/0119452 | A1 | 6/2003 | Kim et al. | |
| 2003/0189918 | A1 | 10/2003 | Das et al. | |

FOREIGN PATENT DOCUMENTS

| | | | | |
|---|---|---|---|---|
| CN | 1383625 | A | 12/2002 | |
| EP | 1046315 | A2 | 10/2000 | |
| EP | 1180866 | | 3/2001 | ............. H04J 11/00 |
| EP | 1351538 | | 3/2003 | ............. H04Q 7/38 |
| EP | 1 351 538 | * | 8/2003 | ............. H04Q 7/38 |
| JP | 2001274767 | | 10/2001 | |
| JP | 2003229811 | | 8/2003 | |
| JP | 2003318781 | | 11/2003 | |
| JP | 2004509553 | A | 3/2004 | |
| JP | 2006502659 | A | 1/2006 | |
| WO | 0076083 | | 5/2000 | ............. H04B 7/005 |
| WO | 0173990 | A1 | 10/2001 | |
| WO | 0225839 | A1 | 3/2002 | |
| WO | 2004034656 | A2 | 4/2004 | |
| WO | 05022774 | | 3/2005 | ............. H04B 7/005 |
| WO | 2005022777 | A1 | 3/2005 | |

OTHER PUBLICATIONS

Written Opinion—PCT/US2005/011237, International Search Authority—European Patent Office, dated Jul. 25, 2005.
International Preliminary Report on Patentability—PCT/US2005/011237, International Preliminary Examining Authority/US—Alexandria, Virginia—dated Jan. 3, 2007.
Taiwan Search Report—TW094111192—TIPO—dated Aug. 3, 2011.

* cited by examiner

«SHARED SIGNALING CHANNEL FOR A COMMUNICATION SYSTEM»

This application claims the benefit of provisional U.S. application Ser. No. 60/590,125, entitled "Signaling Channel (SCH) Design," filed Jul. 21, 2004.

BACKGROUND

I. Field

The present disclosure relates generally to communication, and more specifically to transmission of signaling in a communication system.

II. Background

A multiple-access communication system can support communication for multiple terminals on the forward and reverse links. The forward link (or downlink) refers to the communication link from the base stations to the terminals, and the reverse link (or uplink) refers to the communication link from the terminals to the base stations.

A multiple-access system typically allocates some system resources for transmission of signaling on the forward link to the terminals in the system. The signaling may be for various types of information needed for proper system operation, as described below. The signaling is often sent on a signaling channel, which may also be called an overhead channel, a control channel, or a broadcast channel.

The signaling channel is often sent as either a unicast channel or a broadcast channel. For a unicast signaling channel, each signaling message (or simply, "message") is for a specific terminal and is encoded separately and then sent on the signaling channel to that terminal. Encoding each message individually results in poor coding efficiency and performance. For a broadcast signaling channel, messages for all terminals may be encoded together and then sent on the signaling channel to the terminals. Encoding all messages together improves coding efficiency and performance. However, the broadcast signaling channel is operated in a manner such that all terminals, including the worst-case terminal with the worst channel condition, can decode this signaling channel. This may be achieved by using a low code rate and/or high transmit power for the broadcast signaling channel. Operating the broadcast signaling channel to satisfy the worst-case terminal often results in inefficient use of the system resources allocated for the signaling channel.

There is therefore a need in the art for techniques to more efficiently transmit signaling in a multiple-access communication system.

SUMMARY

In one aspect, a shared signaling channel capable of efficiently carrying various types of signaling for terminals in a multiple-access communication system is described. The shared signaling channel has multiple "segments", which may also be called subchannels. Parameters for the shared signaling channel may or may not be sent to the users in advance. For example, the number of segments, the size of each segment, the rate for each segment, and so on may be broadcast to the users via a separate broadcast/overhead channel. The transmit power for each segment is not broadcast to the users and can range from zero to the total transmit power available for transmission. Signaling for each terminal is sent on one or more segments, which may be dynamically selected based on the channel conditions of the terminal, the operating points of the segments, and so on. The signaling for the terminals may comprise resource assignment messages, acknowledgments (ACKs), access grant messages, power control commands, and so on.

In another aspect, to send signaling on the shared signaling channel, a base station obtains signaling for all terminals within its coverage and maps the signaling for each terminal to one or more segments used for the terminal. The base station then processes the signaling mapped to each segment to generate output data for the segment. For a segment with jointly encoded signaling, an error detection code value (e.g., a CRC value) is generated for all signaling mapped to the segment, and the signaling and CRC value are then encoded, modulated, and scaled to generate an output packet for the segment. For a segment with individually encoded signaling, the signaling for each terminal is mapped to a codeword, and the codeword is mapped to a transmission span (e.g., a set of frequency subbands or a time interval) assigned to the terminal. In any case, the output data for each segment is multiplexed onto the system resources allocated for the segment and is transmitted at a power level selected for the segment.

In a further aspect, a terminal performs complementary receiver processing to recover its signaling from one or more segments of the shared signaling channel. Various aspects and embodiments are described in further detail below.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The shared signaling channel described herein may be used for various communication systems such as an Orthogonal Frequency Division Multiple Access (OFDMA) system, a Time Division Multiple Access (TDMA) system, a Frequency Division Multiple Access (FDMA) system, a Code Division Multiple Access (CDMA) system, and so on. An OFDMA system utilizes orthogonal frequency division multiplexing (OFDM), which is a multi-carrier modulation technique. OFDM effectively partitions the overall system bandwidth into multiple (K) orthogonal frequency subbands, which are also called tones, subcarriers, bins, frequency channels, and so on. Each subband is associated with a respective subcarrier that may be modulated with data.

Figure 1:
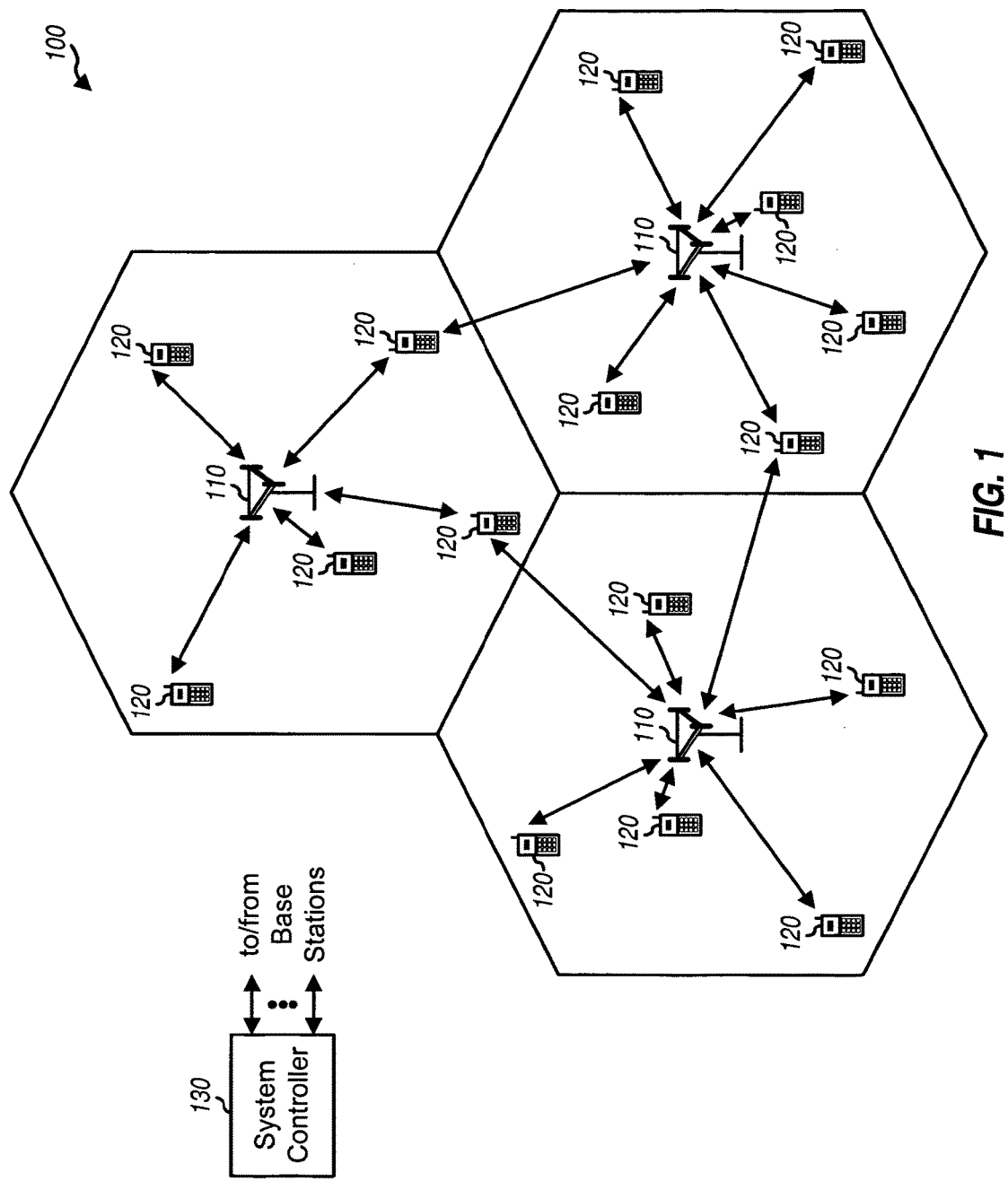
FIG. 1 shows a wireless multiple-access communication system.

FIG. 1 shows a wireless multiple-access communication system 100 with a number of base stations 110 that support communication for a number of wireless terminals 120. A base station is typically a fixed station used for communicating with the terminals and may also be called an access point, a Node B, or some other terminology. Terminals 120 are typically dispersed throughout the system, and each terminal may be fixed or mobile. A terminal may also be called a mobile station, a user equipment (UE), a wireless communication device, or some other terminology. Each terminal may communicate with one or possibly multiple base stations on the forward and reverse links at any given moment. Each terminal may also receive signaling from any number of base stations on the forward link, depending on the system design. For a centralized architecture, a system controller 130 provides coordination and control for the base stations.

As shown in FIG. 1, terminals with different channel conditions may be distributed throughout the system. The channel conditions of each terminal may be dependent on various factors such as fading, multipath, and interference effects. The channel conditions of each terminal may be quantified by a signal quality metric such as a signal-to-interference-and-noise ratio (SNR), received pilot strength, and so on. In the description below, SNR is used to quantify the channel conditions of a terminal.

A given base station may have a number of terminals within its coverage area, which typically includes weak and strong terminals. A weak terminal observes weak pilot strength from the base station and achieves a low SNR for a given nominal transmit power level from the base station. The low SNR may be due to a low channel gain between the terminal and the base station and/or high interference from other base stations. The weak terminal may be located anywhere within the coverage area of the base station but is typically located at the coverage edge. The weak terminal typically requires high transmit power from the base station to achieve a given target SNR. In contrast, a strong terminal observes strong pilot strength from the base station and achieves a high SNR for the same nominal transmit power level from the base station. The strong terminal typically requires less transmit power from the base station to achieve the same target SNR.

The base station may use the shared signaling channel to efficiently transmit signaling to terminals with a wide range of channel conditions. The shared signaling channel has multiple (N) segments. Each segment is a division of the shared signaling channel and may also be called a channel, a subchannel, or some other terminology. The multiple segments may be defined and operated in various manners. For example, each segment may carry signaling for terminals with SNRs that fall within (or exceed) an SNR range covered by that segment. The signaling in each segment may be processed and transmitted in an efficient manner, as described below. Any number of segments may be sent in each transmission of the shared signaling channel.

Each terminal is mapped to one or more segments, and signaling messages for the terminal are sent on these segment(s). The terminal-to-segment mapping may be dynamic, and the terminal may or may not be informed of the mapping. The base station may map the terminals to the available segments based on various criteria such as the channel conditions, SNRs of the terminals, quality of service (QoS) requirements, segment preference indicated by the terminals, availability or loading of the segments, and so on. If each terminal attempts to decode all segments, then the base station may dynamically map the terminals to the segments without having to inform the terminals.

The multiple segments of the shared signaling channel may be multiplexed in various manners. Depending on the system design, the system resources allocated for each segment may be given in units of time, frequency, code, and/or transmit power. Several exemplary multiplexing schemes are described below.

Figure 2A:
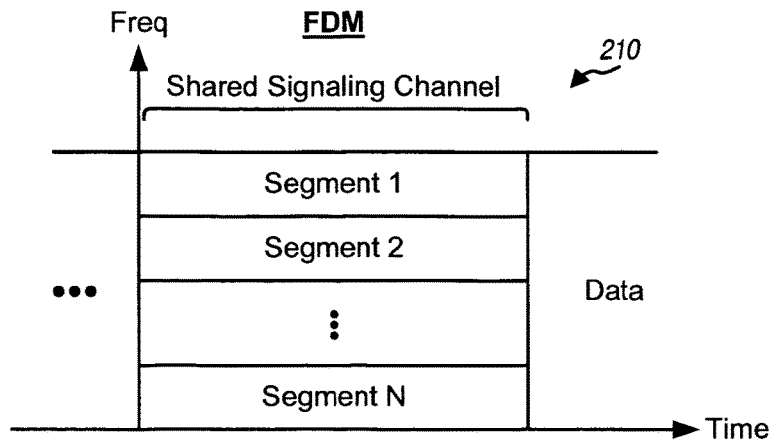
FIGS. 2A, 2B, and 2C show three multiplexing schemes for the multiple segments of the shared signaling channel.

FIG. 2A shows a frequency division multiplexing (FDM) scheme 210 for the shared signaling channel. For the FDM scheme, the entire frequency range allocated for the shared signaling channel is partitioned into multiple frequency subranges, one frequency subrange for each segment. The frequency subranges may be of equal or different sizes. The size of each frequency subrange may be selected based on the actual or expected amount of signaling to send in the segment. The frequency subranges may be fixed, varied at a slow rate, or dynamically adjusted based on signaling requirements.

For an OFDMA system, multiple (P) ports may be defined and assigned port numbers of 1 through P. The P ports may be mapped to P different sets of subbands that are formed with the K total subbands. The P ports may be orthogonal to one another so that no two ports use the same subband in the same symbol period. The mapping of ports to subband sets may be static or may change over time (e.g., using frequency hopping) to achieve frequency diversity. Each segment may be allocated a different set of ports, which may be mapped to subbands across the system bandwidth to achieve frequency diversity. The multiple segments may be allocated the same or different numbers of ports. The number of ports allocated for each segment may be static, varied slowly, or adjusted dynamically.

Figure 2B:
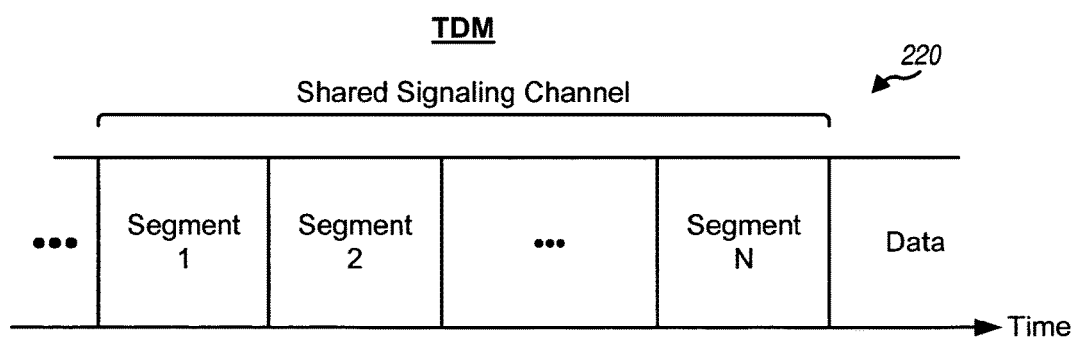

FIG. 2B shows a time division multiplexing (TDM) scheme 220 for the shared signaling channel. For the TDM scheme, the entire time duration allocated for the shared signaling channel is partitioned into multiple time intervals, one time interval for each segment. The time intervals for the segments may be of equal or different durations. The durations of the time intervals may be fixed, varied slowly, or adjusted dynamically. Each segment is sent in its time interval. The multiple segments may be sent in a predetermined order. For example, the segments may be sent in decreasing SNR so that the segment covering the highest SNR range is sent first, the segment covering the next lower SNR range is sent second, and so on, and the segment covering the lowest SNR range is sent last. This transmission order allows the first transmitted segment (which can be decoded by all terminals) to carry information for subsequent segments (e.g., indicating whether or not a later segment is being sent). The segments may also be sent in increasing SNR so that the segment covering the lowest SNR range is sent first, the segment covering the next higher SNR range is sent second, and so on, and the segment covering the highest SNR range is sent last. For this transmission order, a terminal can terminate the processing of the shared signaling channel upon encountering a decoding error for any segment since later segments require higher SNRs. In general, the segments may be sent in any order.

Figure 2C:
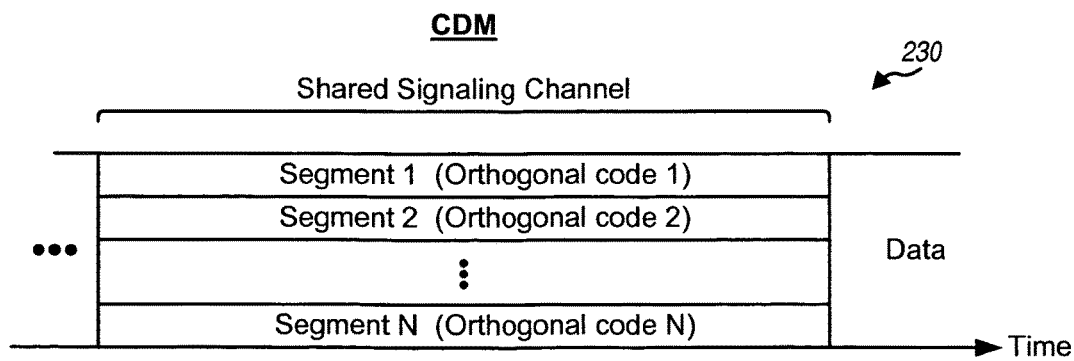

FIG. 2C shows a code division multiplexing (CDM) scheme 230 for the shared signaling channel. For the CDM scheme, each segment is assigned a different orthogonal code (e.g., a Walsh code). The multiple segments may be processed (or "covered") with their orthogonal codes and transmitted simultaneously.

Multiple (typically two) segments may also be sent using hierarchical or layered coding. One segment is sent at a higher transmit power level and/or a lower rate, and another segment is sent at a lower transmit power level and/or a higher rate. Signaling to be sent in the two segments may be (1) mapped to modulation symbols separately and then combined or (2) jointly mapped to modulation symbols based on a joint signal constellation. The segment sent with the higher transmit power and/or lower rate is decoded first and canceled, and the segment sent with the lower transmit power and/or higher rate is then decoded.

The multiple segments of the shared signaling channel may also be multiplexed using a combination of TDM, FDM, CDM, and/or some other multiplexing schemes. For example, in an OFDMA system, the shared signaling channel may be allocated a specific set of subbands or ports, and the multiple segments may be transmitted using TDM on the allocated subbands or ports.

For all multiplexing schemes, the shared signaling channel may be sent periodically, e.g., in each frame of a predetermined time duration. The shared signaling channel may also be sent in a fixed or variable time interval, which may be dependent on the amount of signaling to send.

The shared signaling channel is associated with various parameters such as the number of segments for the channel, the size of each segment, the system resources used for each segment, the rate for each segment, and the transmit power for each segment. Various embodiments of the shared signaling channel may be formed with different values for these parameters.

The shared signaling channel may have any number of segments, which may be selected based on a tradeoff between various factors such as transmission efficiency and coding efficiency. More segments allow for targeted transmission to smaller groups of terminals, which typically improves transmission efficiency. Fewer segments allow for better coding efficiency and greater statistical multiplexing benefits. The number of segments may be fixed (e.g., at two, four, six, and so on) or may be variable (e.g., determined based on the number of terminals and their distribution of SNRs). In an embodiment, a fixed number of segments are defined, but a variable number of segments may be sent in each transmission of the shared signaling channel.

Each segment has a size that may be given in units of information bits. In one embodiment, all segments have the same size and can carry the same number of information bits. In another embodiment, the segments have different sizes and can carry different numbers of information bits. The size of each segment may be fixed (e.g., determined based on an expected payload for the segment) or may be variable (e.g., determined based on the actual payload for the segment).

Each segment is sent using the system resources allocated for that segment. The system resources for each segment may be given as a set of subbands or ports, a time interval, an orthogonal code, and so on. The amount of system resources allocated for each segment is typically determined by the segment size and the rate used for the segment.

Each segment is sent at a rate selected for that segment. The selected rate indicates a particular coding scheme or code rate and a particular modulation scheme to use for the segment. The selected rate is also associated with a particular spectral efficiency and a particular minimum SNR required to reliably decode a transmission sent at that rate. Spectral efficiency is normally given in units of bits/second/Hertz (bps/Hz). The system may support a specific set of rates, and the rate for each segment may be selected from among the supported rates.

Each segment is transmitted at a power level selected for that segment. If multiple segments are transmitted simultaneously (e.g., for the FDM and CDM schemes), then the total transmit power available for transmission is distributed among all of the segments being transmitted simultaneously. If multiple segments are transmitted at different times (e.g., for the TDM scheme), then each segment may be sent at either peak transmit power to maximize SNR or lower transmit power to reduce interference.

Each of the parameters of the shared signaling channel may be fixed or variable. Fixed parameters (e.g., fixed segment size, fixed rate, and fixed resource allocation) for each segment may simplify the processing of the segments by the terminals. Variable parameters (e.g., variable transmit power) can provide flexibility to meet signaling requirements. The shared signaling channel may be designed with one or more fixed parameters (e.g., fixed segment size, rate, and resource allocation) and one or more variable parameters (e.g., variable transmit power). The configuration or parameters of the shared signaling channel may be sent, e.g., via a separate broadcast/overhead channel to all terminals. The transmit power used for the shared signaling channel does not need to be sent to the terminals since only decoding result, and not receiver processing, is dependent on transmit power. In an embodiment, the transmit power for each segment is determined at the last moment based on the component messages and the desired SNR range for the segment. For the FDM and CDM schemes, the sum of the transmit powers for all segments is constrained to be less than or equal to the maximum transmit power. This embodiment allows for the distribution of system resources (transmit power) to the segments without informing any users. This dynamic power allocation enables very fast adaptation to the channels of the users without requiring a separate signaling message to be sent to the users to announce resource changes, which is possible because the receivers do not need to change its manner of operation based on transmit power. If any configuration parameter for the shared signaling channel is not sent, then the terminals may perform "blind detection" for each parameter (e.g., rate, segment size, and so on) that can change and attempt to decode each segment for each possible value of that parameter.

The transmit power and rate for each segment are selected to achieve the desired performance for the segment. In an embodiment, all segments are sent at the same rate but at different power levels to allow terminals with different channel conditions to reliably receive their signaling. This embodiment is well suited for the FDM and CDM schemes whereby multiple segments are transmitted simultaneously and share the total transmit power. In another embodiment, all segments are transmitted at the same power level but different rates. This embodiment is well suited for the TDM scheme whereby only one segment is transmitted at a time and the total transmit power is available for the segment. In yet another embodiment, the multiple segments are transmitted at different rates and different power levels. In general, each segment is transmitted at a power level and a rate that allows all terminals mapped to that segment to reliably decode the segment. For an OFDMA system, each segment may be allocated a specific set of subbands or ports that is static or changes infrequently, but the transmit power for each segment can vary dynamically from frame to frame.

Each segment may be viewed as having an operating point, which is the minimum SNR required to reliably decode that segment (e.g., with a 1% packet error rate). All terminals achieving the minimum SNR or better for a given segment can reliably decode that segment. The operating point for each segment is determined by the transmit power and the rate used for the segment. The multiple segments may be sent with different operating points. For example, four segments may be sent with operating points of −5.0, −2.5, 0.0, and 2.5 dB. The operating points of the segments may be varied by adjusting their transmit powers and/or rates.

In an embodiment of the shared signaling channel, a fixed number of (N) segments are defined, the segments have different sizes, and each segment has a fixed size, a fixed rate, a fixed allocation of system resources and variable transmit power. Any number and any one of the N segments may be transmitted in each transmission of the shared signaling channel. A single segment may be used to send signaling for all terminals whenever possible. If only one segment is sent, then the smallest segment with the least number of information bits may be used in order to maximize coverage for the shared signaling channel. Multiple segments may be used to increase the number of terminals that can be served and/or to increase the number of information bits that can be sent to strong terminals. The base station may select which segment(s) to use and may allocate the total transmit power to the selected segment(s) in a dynamic manner (e.g., in each frame) based on the amount of signaling to send and the recipient terminals of the signaling.

In general, the base station can dynamically adjust the transmit power and/or rate of each segment to specifically serve only the terminals mapped to that segment, and not all terminals in the base station coverage area. The shared signaling channel can thus be operated more efficiently than a broadcast signaling channel that is sent such that the worst-case terminal in the system can decode this channel at all times. With the shared signaling channel, each segment only needs to serve the worst-case terminal mapped to that segment, which may have much better channel conditions than the worst-case terminal in the system.

The signaling for the shared signaling channel may be processed in various manners. In a first encoding embodiment, all signaling messages in a segment are jointly encoded and then modulated to generate an output packet for the segment. Each message may carry signaling for one or multiple terminals. The messages in each segment may be for one or more types of signaling.

Figure 3:
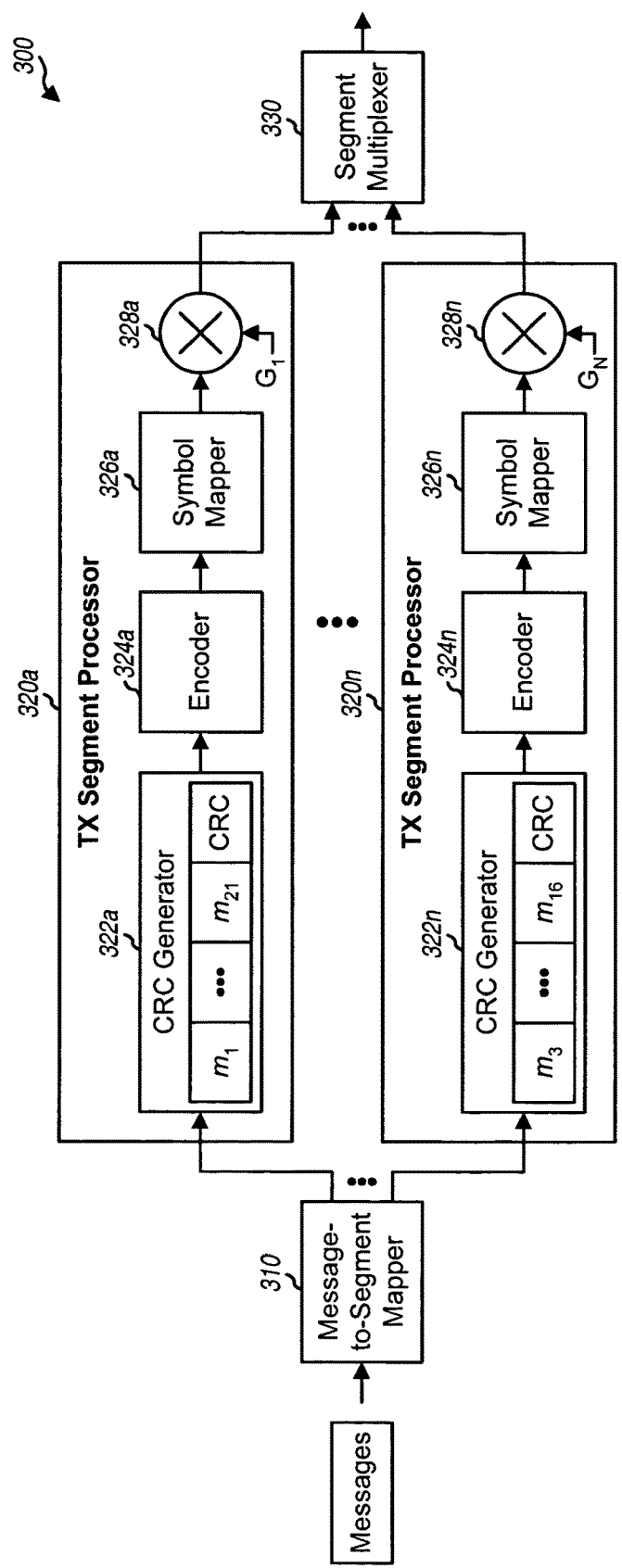
FIG. 3 shows a transmit (TX) signaling channel processor at a base station for segments with jointly encoded messages.

FIG. 3 shows an embodiment of a shared signaling channel processor 300 for the first encoding embodiment. Channel processor 300 includes a message-to-segment mapper 310, N TX segment processors 320a through 320n for N segments of the shared signaling channel, and a segment multiplexer 330. Mapper 310 receives messages to be sent on the shared signaling channel, which are denoted as $m_1$, $m_2$, $m_3$, and so on. For each message, mapper 310 identifies the recipient terminal(s) of the message, determines the segment in which to send the message based on the recipient terminal(s), and forwards the message to TX segment processor 320 for this segment.

Each TX segment processor 320 processes messages for one segment. Within each TX segment processor 320, a cyclic redundancy check (CRC) generator 322 concatenates all messages in the segment, generates a CRC value for these messages, appends the CRC value to the messages, and provides a formatted packet containing the messages and the CRC value. An encoder 324 encodes the formatted packet in accordance with a coding scheme or code rate selected for the segment and provides a coded packet. A symbol mapper 326 maps the code bits in the coded packet to modulation symbols based on a modulation scheme selected for the segment. A multiplier 328 scales the modulation symbols from symbol mapper 326 with a gain value $G_n$ that determines the amount of transmit power to use for the segment. Each TX segment processor 320 provides an output packet containing scaled modulation symbols for its segment.

Multiplexer 330 receive the output packets from all TX segment processors 320a through 320n and multiplexes the output packet for each segment onto the system resources allocated for that segment. For the FDM scheme, multiplexer 330 may provide the output packet for each segment on the subbands or ports assigned to that segment. For the TDM scheme, multiplexer 330 may provide each output packet in a different time interval. For the CDM scheme, multiplexer 330 may process (or cover) the output packet for each segment with the orthogonal code assigned to that segment. In any case, multiplexer 330 provides output data for the shared signaling channel. The output data is processed (e.g., OFDM modulated) and transmitted to the terminals.

For the embodiment shown in FIG. 3, the messages in each segment are protected with a CRC value and jointly encoded as one packet. A terminal is able to individually decode the packet for each segment and check the decoded packet based on the appended CRC value to determine whether the packet was decoded correctly or in error. For each packet that passes the CRC check, the terminal can examine the messages in the packet to look for any message sent for the terminal.

The joint encoding of the messages in each segment provides various benefits including:

Higher coding gain due to the use of a larger packet size for the segment;

Stronger error detection capability due to the use of the CRC value computed for all messages in the segment; and Visibility of messages sent to other terminals mapped to the same segment.

The ability to view messages sent to other terminals may be used for logic error detection, implicit signaling, and other purposes. For logic error detection, a terminal detects for errors in its message by verifying that the content of its message is not inconsistent with the content of other messages. For example, if a first terminal observes an assignment for a second terminal that conflicts with the first terminal's current assumption of its own assignment, then the first terminal may assume that the system has a different assumption of the first terminal's assignment and may then initiate corrective action. For implicit signaling, a terminal receives signaling for itself implicitly via signaling sent for another terminal. For example, if a message for the first terminal assigns port x to this terminal, and if the second terminal is already assigned port x, then the second terminal may interpret the assignment of port x to the first terminal as an implicit de-assignment of the same port x from the second terminal.

In a second encoding embodiment, the messages in each segment are individually encoded and sent specifically to the recipient terminals. Each segment may be partitioned into multiple transmission spans that are given unique indices. Each transmission span may correspond to a different set of subbands or ports, a different time interval, and so on. Each transmission span may be assigned to one or more terminals and would then carry messages for the assigned terminal(s).

Figure 4:
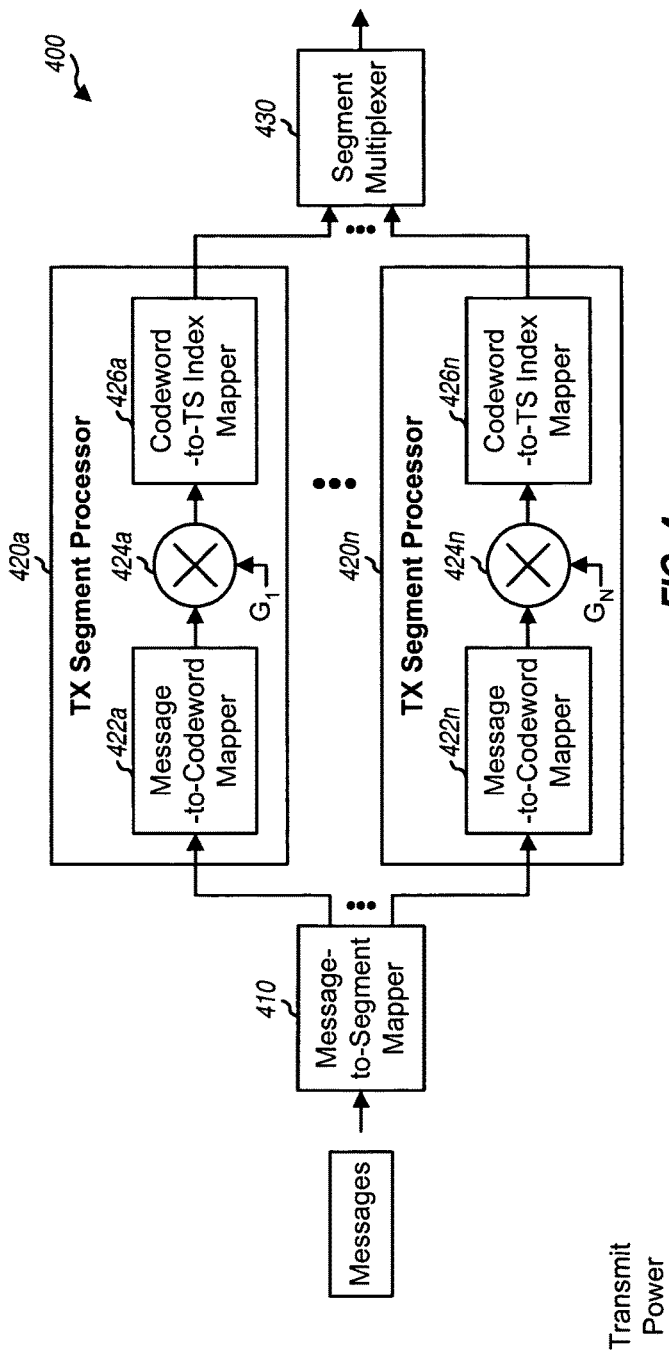
FIG. 4 shows a TX signaling channel processor for segments with individually encoded messages.

FIG. 4 shows an embodiment of a shared signaling channel processor 400 for the second encoding embodiment. Channel processor 400 includes a message-to-segment mapper 410, N TX segment processors 420a through 420n for N segments of the shared signaling channel, and a segment multiplexer 430. Mapper 410 receives messages for the terminals, identifies the recipient terminal(s) of each message, determines the segment for the message based on the recipient terminal(s), and forwards the message to the appropriate TX segment processor 420. Each TX segment processor 420 processes messages for one segment. Within each TX segment processor 420, a message-to-codeword mapper 422 maps each message to a codeword. Each message may have a fixed length of one or more bits. Each codeword may also have a fixed length of one or more bits. The codeword for each message may be selected from a codebook containing all valid codewords. For example, a message of either '0' or '1' may be mapped to a codeword of either +1 or −1, respectively. A multiplier 424 scales each codeword from message mapper 422 with a gain value $G_n$ that determines the amount of transmit power to use for the segment. A codeword-to-transmission span (TS) index mapper 426 maps each scaled codeword onto the transmission span assigned to the recipient terminal(s) of the codeword. Multiplexer 430 receives the scaled codewords from all TX segment processors 420a through 420n and multiplexes the scaled codewords for each segment onto the system resources (e.g., subbands or time intervals) allocated for that segment.

Figure 5:
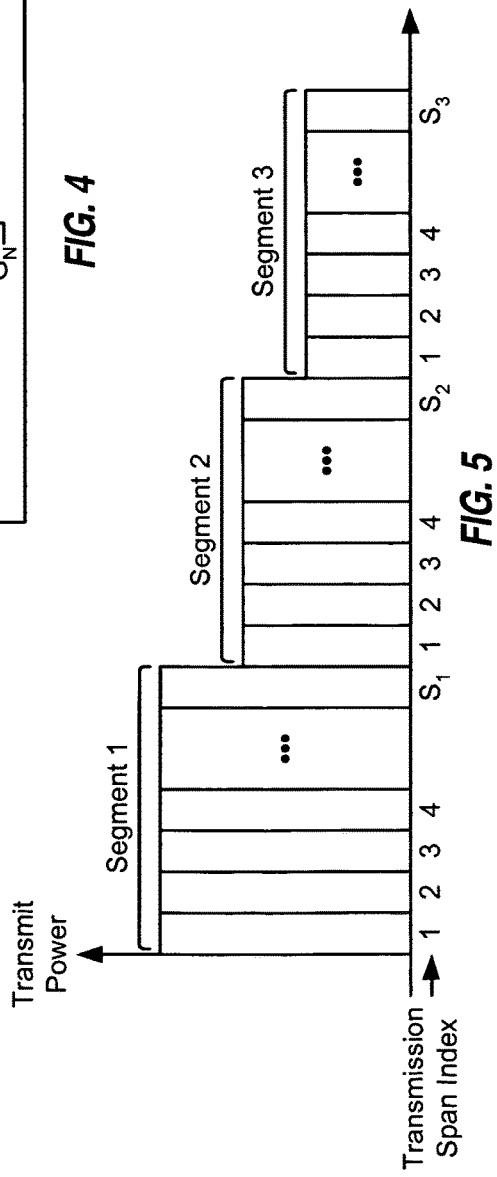
FIG. 5 shows transmission of individually encoded messages.

FIG. 5 shows an exemplary transmission of the shared signaling channel for the second encoding embodiment. For this example, the shared signaling channel has three segments. The first segment is partitioned into $S_1$ transmission spans with indices of 1 through $S_1$, the second segment is partitioned into $S_2$ transmission spans with indices of 1 through $S_2$, and the third segment is partitioned into $S_3$ transmission spans with indices of 1 through $S_3$. The first segment serves weak terminals with poor channel conditions and is transmitted at high power level. The second segment serves moderate terminals with fair channel conditions and is transmitted at medium power level. The third segment serves strong terminals with good channel conditions and is transmitted at low power level. Each terminal is informed of its assigned transmission span index and processes its transmission span to receive messages sent to the terminal. In general, there may not be an a priori ordering of the transmit power levels for the segments, and the terminals typically do not know which segments will be targeting which minimum SNR levels.

The second encoding embodiment may be used to efficiently send certain types of signaling, e.g., signaling with fixed-size messages, signaling that are sent periodically or often, signaling that can tolerate errors, and so on. For example, the second encoding embodiment may be used to send acknowledgments (ACKs), power control (PC) commands, and so on, which are described below.

The first encoding embodiment jointly encodes all messages in each segment. The second encoding embodiment independently encodes the messages in each segment. The shared signaling channel may include both types of segments, i.e., one or more segments with jointly encoded messages and one or more segments with independently encoded messages.

Figure 6:
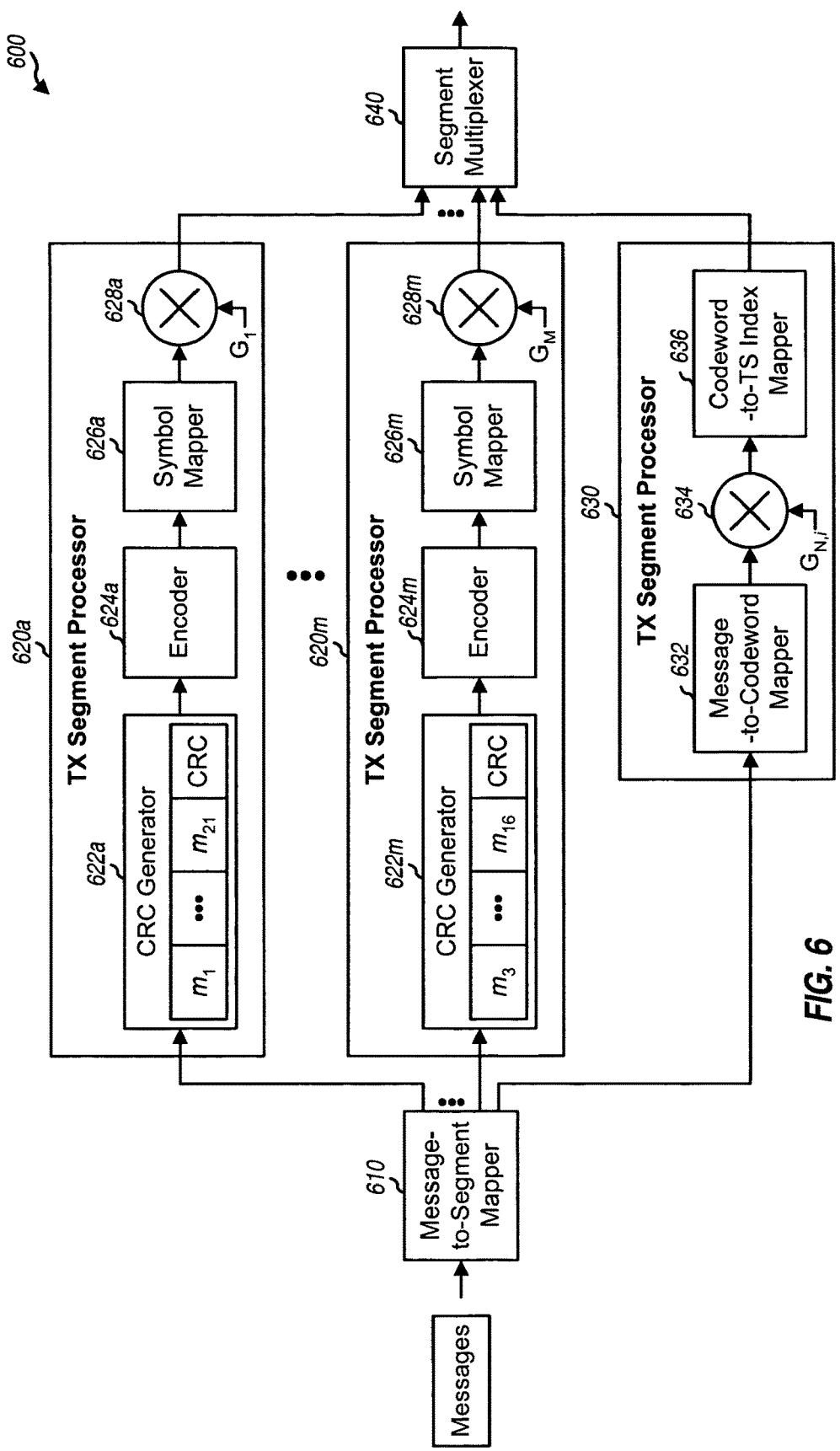
FIG. 6 shows a TX signaling channel processor for multiple segments with jointly encoded messages and a segment with individually encoded messages.

FIG. 6 shows an embodiment of a shared signaling channel processor 600 for both types of segments. Channel processor 600 includes a message-to-segment mapper 610, M TX segment processors 620a through 620m for M segments with jointly encoded messages, a TX segment processor 630 for a segment with individually encoded messages, and a segment multiplexer 640. Mapper 610 receives messages to be sent on the shared signaling channel and provides these messages to the appropriate TX segment processors based on the recipient terminals of the messages. Each TX segment processor processes messages for one segment. Each TX segment processor 620 is implemented as described above for TX segment processor 320 in FIG. 3. TX segment processor 630 is implemented as described above for TX segment processor 420 in FIG. 4. However, the codeword for each transmission span i is scaled with a gain value $G_{N,i}$ for that transmission span. The codewords/messages for different terminals may thus be transmitted at individually selected power levels. For the FDM and CDM schemes, the total power for all of the segments being sent simultaneously is limited by the total transmit power available for transmission.

For the embodiment shown in FIG. 6, the segments with jointly encoded messages may carry certain types of signaling such as, e.g., system resource assignments, jointly encoded ACKs for multiple terminals, and so on. The segment with individually encoded messages may carry other types of signaling such as, e.g., ACKs for individual terminals, PC commands, and so on. A given type of signaling (e.g., ACK) may be sent on both types of segment, as described below.

Figure 7:
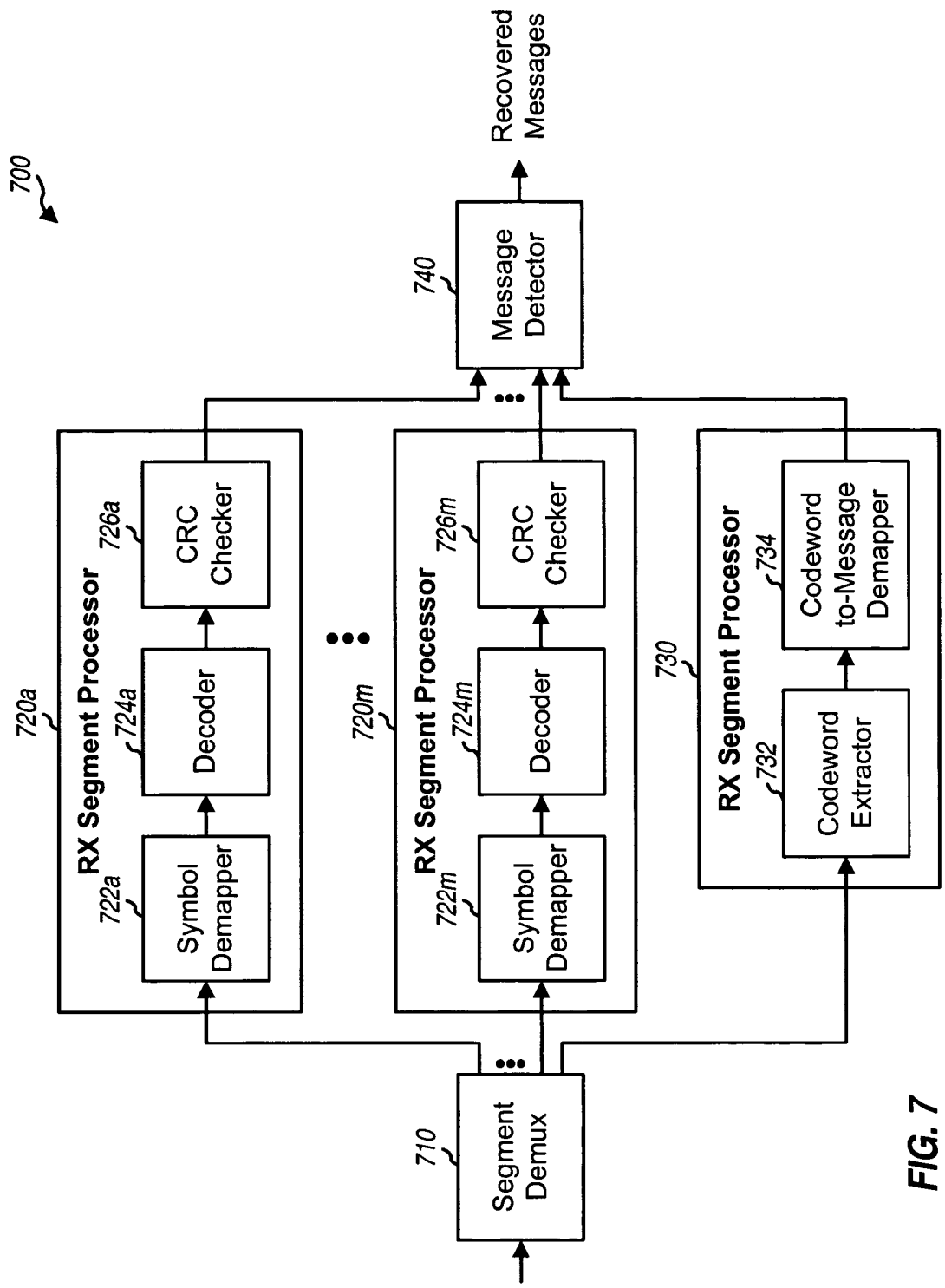
FIG. 7 shows a receiver (RX) signaling channel processor at a terminal.

FIG. 7 shows an embodiment of a shared signaling channel processor 700 at a terminal for both types of segments. Channel processor 700 includes a segment demultiplexer (Demux) 710, M RX segment processors 720a through 720m for M segments with jointly encoded messages, an RX segment processor 730 for a segment with individually encoded messages, and a message detector 740. Mapper 710 obtains received symbols for the N segments of the shared signaling channel and provides the received symbols for each received segment to an appropriate RX segment processor.

Each RX segment processor performs processing for one segment. Within each RX segment processor 720, a symbol demapper 722 demodulates the received symbols for its segment based on the modulation scheme used for the segment. A decoder 724 decodes the demodulated data based on the coding scheme or code rate used for the segment and provides a decoded packet for the segment. A CRC checker 726 checks the decoded packet with the CRC value appended in the packet and provides the packet to message detector 740 if the CRC passes. Message detector 740 receives decoded packets from all RX segment processors 720, examines the messages in these packets to look for messages sent to the terminal, and provides recovered messages for the terminal. Message detector 740 may also perform other processing, e.g., for implicit signaling. Within RX segment processor 730, a codeword extractor 732 obtains a codeword from a transmission span to which the terminal is assigned, if any. A codeword-to-message demapper 734 provides a message that is a best guess of the extracted codeword.

A specific design of the shared signaling channel for an exemplary OFDMA system is described below. This exemplary shared signaling channel has four segments that are called SCH1, SCH2, SCH3 and SCH4. SCH1 serves weak terminals with poor channel conditions, SCH2 serves moderate terminals with fair channel conditions, and SCH3 serves strong terminals with good channel conditions. SCH4 carries unicast transmissions for specific terminals. SCH1, SCH2 and SCH3 carry jointly encoded messages, and SCH4 carries individually encoded messages.

SCH1, SCH2, SCH3 and SCH4 have fixed sizes of $L_1$, $L_2$, $L_3$ and $L_4$ information bits, respectively. The size of each segment is selected based on the expected payload for the segment. The segments may have equal sizes so that $L_1$, $L_2$, $L_3$ and $L_4$ are all equal. Alternatively, two or more segments may have different sizes so that $L_1$, $L_2$, $L_3$ and $L_4$ may be different.

SCH1, SCH2, SCH3 and SCH4 are sent at fixed rates of $R_1$, $R_2$, $R_3$ and $R_4$, respectively. The rate of each segment may be selected based on a nominal operating point for that segment. The segments may be sent at the same rates so that $R_1$, $R_2$, $R_3$ and $R_4$ are the same. Alternatively, the segments may be sent at different rates so that $R_1$, $R_2$, $R_3$ and $R_4$ may be different.

SCH1, SCH2 and SCH3 are transmitted at power levels of $P_1$, $P_2$ and $P_3$, respectively. The transmit power level for each segment is selected to achieve the desired performance for the segment. The segments may be transmitted at the same power level so that $P_1$, $P_2$ and $P_3$ are equal. Alternatively, the segments may be transmitted at different power levels so that $P_1$, $P_2$ and $P_3$ may be different. A transmit power level of zero may be used for any segment to omit transmission of that segment.

As a specific example, SCH1, SCH2, SCH3 and SCH4 may have the following sizes: $L_1$=100, $L_2$=200, $L_3$=300, and $L_4$=20 information bits. SCH1, SCH2 and SCH3 are sent at the same rate that corresponds to a code rate of 1/3 and quadrature phase shift keying (QPSK) modulation. SCH4 is sent at a lower rate that corresponds to a code rate of 1/8 and binary phase shift keying (BPSK) modulation.

For SCH1, SCH2 and SCH3, each information bit is encoded to generate three code bits, and each pair of code bits is mapped to one QPSK modulation symbol. The 100 information bits for SCH1 are sent in 150 modulation symbols, the 200 information bits for SCH2 are sent in 300 modulation symbols, and the 300 information bits for SCH3 are sent in 450 modulation symbols. For SCH4, each information bit is encoded to generate eight code bits, and each code bit is mapped to one BPSK modulation symbol. The 20 information bits for SCH4 are sent in 160 modulation symbols. A total of 1060 modulation symbols are generated and sent for a total of 620 information bits for SCH1, SCH2, SCH3 and SCH4.

The exemplary OFDMA system has an OFDM structure with K=2048 total subbands. Since one modulation symbol may be sent on each subband in a given symbol period, SCH1, SCH2, SCH3 and SCH4 may be allocated 150, 300, 450 and 160 subbands, respectively. The 1060 modulation symbols for the four segments may be sent in 1060 subbands in one symbol period. The remaining 988 subbands may be used for traffic data, pilot, other overhead information, null data (or guard subbands), and so on. The 1060 subbands for the four segments may also be selected to reduce interference to neighboring base stations.

Figure 8:
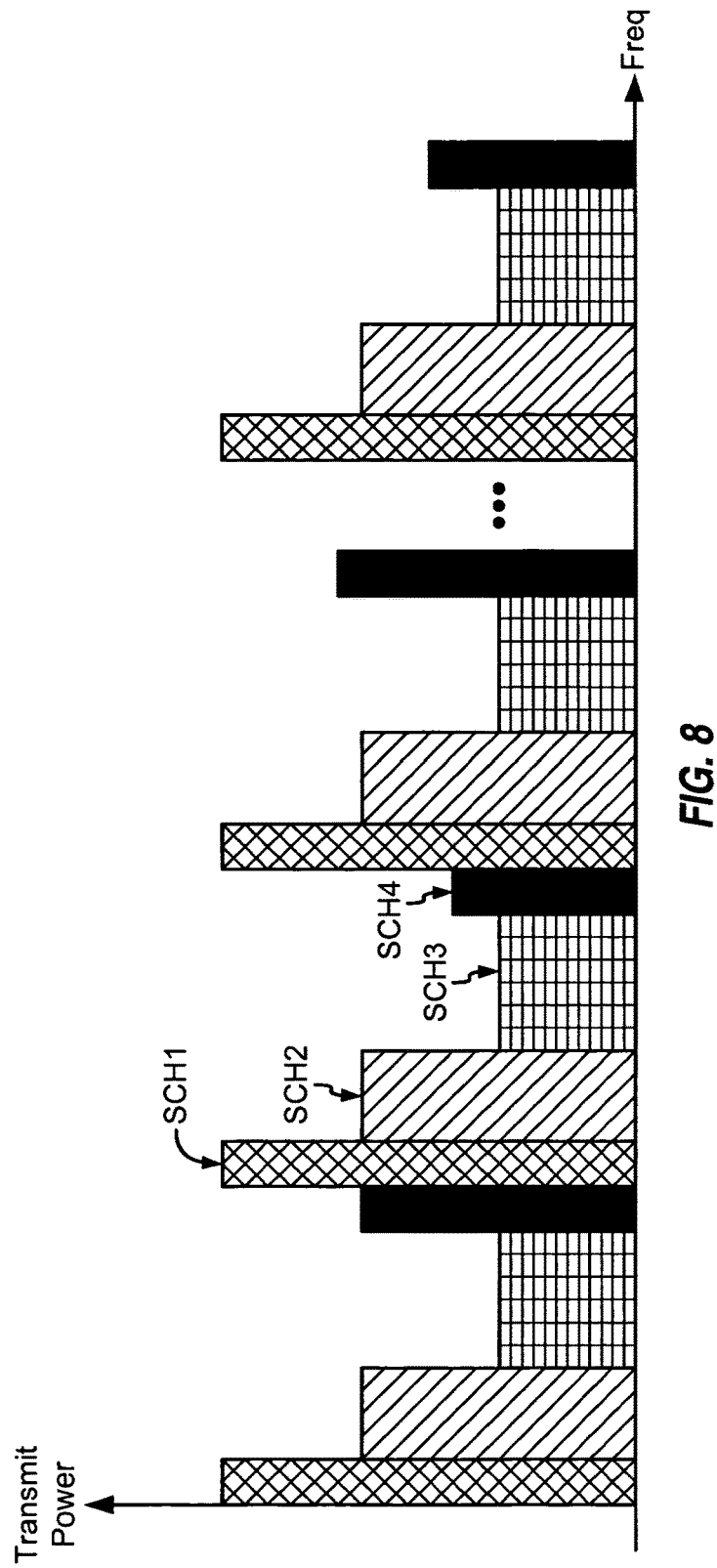
FIG. 8 shows transmission of four segments of the shared signaling channel.

FIG. 8 shows a transmission of SCH1, SCH2, SCH3 and SCH4 for the exemplary shared signaling channel. Each segment is sent on a set of subbands selected from across the K total subbands to achieve frequency diversity. The segments are also transmitted at different power levels. SCH1 targeting weak terminals is transmitted at high power level, SCH2 targeting moderate terminals is transmitted at medium power level, and SCH3 targeting strong terminals is transmitted at low power level. SCH4 targeting individual terminals are transmitted at different power levels.

A given terminal achieves different received SNRs for SCH1, SCH2 and SCH3 because these segments are transmitted at different power levels. The different received SNRs for SCH1, SCH2 and SCH3, which are all sent with the same rate, result in different probabilities of decoding error for these three segments. A strong terminal may be able to decode all three segments whereas a weak terminal may only be able to decode SCH1, which is transmitted at high power level.

The description above is for a specific example with four segments SCH1, SCH2, SCH3 and SCH4. In general, the transmit powers for the segments and the ordering of the segments may not be known in the system. For example, all transmit power for the shared signaling channel may be used for SCH1 at one time instance, then for SCH3 at another time instance, then for both SCH1 and SCH2 at another time instance, and so on. Each segment may not necessarily be targeted to users with specific channel conditions.

The base station can control the coverage region of each segment by using an appropriate amount of transmit power for that segment. Improved coverage is achieved for SCH1 with high transmit power, and reduced coverage is achieved for SCH3 with low transmit power. For a given transmit power level, a tradeoff between rate and coverage may be made, e.g., higher rate with reduced coverage, or lower rate with improved coverage. For a given fixed rate, as in the above example, coverage may be determined by controlling transmit power. In general, the base station may tune the coverage of the multiple segments to match deployment. The base station may also dynamically or adaptively change the coverage of the segments, e.g., depending on scheduling algorithm, signaling requirements, terminal distribution, and so on. The base station may change the coverage of each segment by simply changing the transmit power level used for the segment. The terminals do not need to be informed of the transmit power used for each segment.

The shared signaling channel may carry various types of signaling such as resource/channel assignments, access grants, ACKs, T2P, PC commands, information requests, and so on. Table 1 lists some types of signaling that may be sent on the shared signaling channel.

TABLE 1

| Signaling | Description |
|---|---|
| Resource Assignment | Indicates allocation of system resources for the forward and/or reverse link for a terminal. |
| ACK | Indicates whether a packet from a terminal was correctly decoded. |
| T2P | Indicates traffic to pilot ratio for data channels. |
| Access Grant | Indicates grant of system access for a terminal. |
| PC | Directs a terminal to adjust it's transmit power for the reverse link. |
| Info Request | Requests certain information from a terminal. |

The system may define a first set of physical channels for the forward link (FL physical channels) and a second set of physical channels for the reverse link (RL physical channels). A physical channel is a means for sending data and may also be called a traffic channel, a data channel, or some other terminology. The physical channels for each link facilitate allocation and use of the system resources available for that link. The physical channels may be defined for any type of system resources such as subbands or ports, time intervals or slots, code sequences, and so on. For an OFDMA system, multiple physical channels may be defined with the K total subbands or the P ports, and each physical channel is associated with a different set of at least one subband or port. The FL physical channels and the RL physical channels may be defined in the same or different manners.

An access grant message may be sent to grant system access to a terminal. This message may contain, e.g., a timing offset that is used by the terminal to align it timing.

Each terminal that is scheduled for data transmission on the forward link is assigned at least one FL physical channel. Each terminal that is scheduled for data transmission on the reverse link is assigned at least one RL physical channel. Each scheduled terminal may also be provided with other pertinent information such as, for example, the rate to use for data transmission, the maximum transmits power level, and so on. All of the pertinent scheduling information for a scheduled terminal may be conveyed in a resource/channel assignment message. This message may contain, for example, a MAC identifier (ID) for the terminal, a channel identifier (ChID) for each assigned physical channel, a packet format indicating the code rate and modulation scheme to use for data transmission, other information (e.g., time, frequency, and/or code units), and a supplemental bit. The supplemental bit may indicate whether the current channel assignment is for (1) additional system resources that are to be combined with system resources already assigned or (2) new system resources that are to replace the currently assigned system resources (if any).

The system may employ a transmission scheme with feedback to improve reliability for data transmission. This transmission scheme may also be called an automatic repeat request (ARQ) transmission scheme or an incremental redundancy (IR) transmission scheme. For a data transmission on the reverse link, a terminal transmits a data packet to a base station, which may send back an ACK if the packet is decoded correctly or a negative acknowledgment (NAK) if the packet is decoded in error. The terminal receives and uses the ACK feedback from the base station to terminate the transmission of the packet and uses the NAK feedback to retransmit all or a portion of the packet. The terminal is thus able to transmit just enough data for each packet based on the feedback from the base station.

For an ACK-based scheme, the base station sends an ACK only if a packet is decoded correctly and does not send any NAK. ACKs are thus explicitly sent, and NAKs are implicit and presumed by the absence of ACKs. The base station may generate ACKs for all terminals transmitting in each frame. The base station may form a single ACK message for all of the ACKs and may send this ACK message in the segment with the lowest operating point. Alternatively, the base station may form an ACK message for each segment, which contains the ACKs for all terminals mapped to that segment. The base station may also individually send ACKs to some terminals on the segment with individually encoded messages.

The base station may send PC commands to control the transmit power of the terminals transmitting on the reverse link to the base station. The transmission from each terminal may act as interference to the transmissions from other terminals transmitting to the same base station and/or other base stations. The transmit power of each terminal may be adjusted to achieve the desired performance while reducing interference to other terminals. For reverse link power control, the base station measures the SNR of each terminal transmitting to the base station, compares the measured SNR against a target SNR for the terminal, and sends a PC command to direct the terminal to increase or decrease its transmit power to maintain the received SNR at or near the target SNR. The PC commands may be sent on one or both types of segment, similar to the ACKs.

Other types of signaling may also be processed and sent, e.g., in manners similar to those described above for resource assignments, ACKs, and PC commands.

Figure 9:
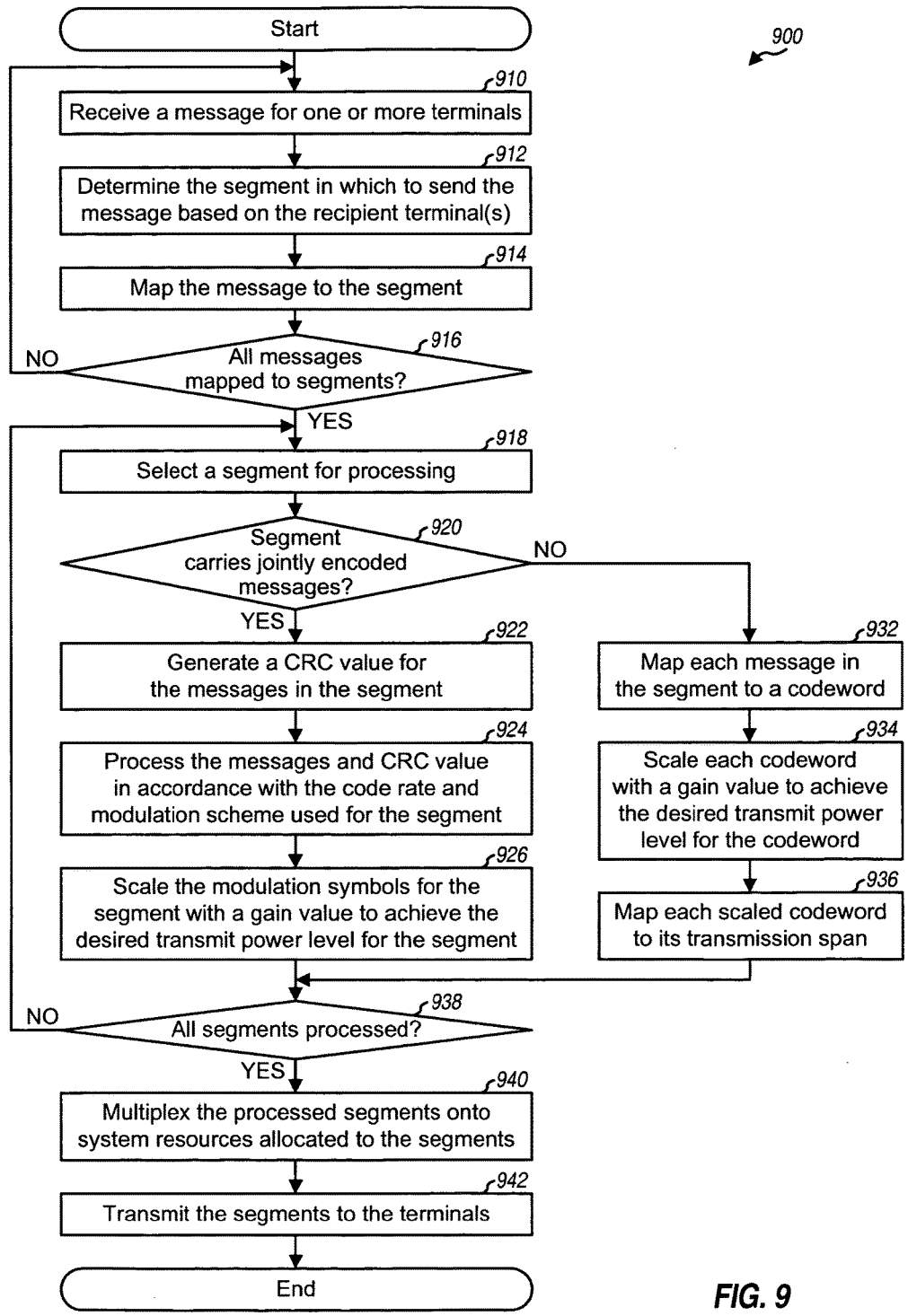
FIG. 9 shows a process to send signaling on the shared signaling channel.

FIG. 9 shows a process 900 performed by a base station to send signaling to terminals on the shared signaling channel. A message for one or more terminals is received (block 910). The segment in which to send the message is determined based on the recipient terminal(s) of the message (block 912), and the message is mapped to this segment (block 914). A determination is then made whether all messages have been mapped to segments (block 916). If the answer is 'No', then the process returns to block 910 to map the next message.

After all messages have been mapped to segments and the answer is 'Yes' for block 916, a segment is selected for processing (block 918). If the selected segment carries jointly encoded messages, as determined in block 920, then a CRC value is generated for the messages in the segment (block 922). The messages and the CRC value are then processed in accordance with the code rate and modulation scheme used for the segment (block 924). The modulation symbols for the segment are scaled with a gain value to achieve the desired transmit power level for the segment (block 926).

If the selected segment carries individually encoded messages, as determined in block 920, then each message is mapped to a codeword (block 932) and scaled with a gain value to achieve the desired transmit power level for the message (block 934). Each scaled codeword is mapped to the transmission span assigned to the recipient terminal(s) of the codeword (block 936).

After processing the selected segment, a determination is made whether all segments have been processed (block 938). If the answer is 'No', then the process returns to block 918 to select another segment for processing. Otherwise, if all segments have been processed, then the processed segments are multiplexed onto the system resources allocated for these segments (block 940). The segments are then transmitted at their selected transmit power levels to the terminals (block 942).

Figure 10:
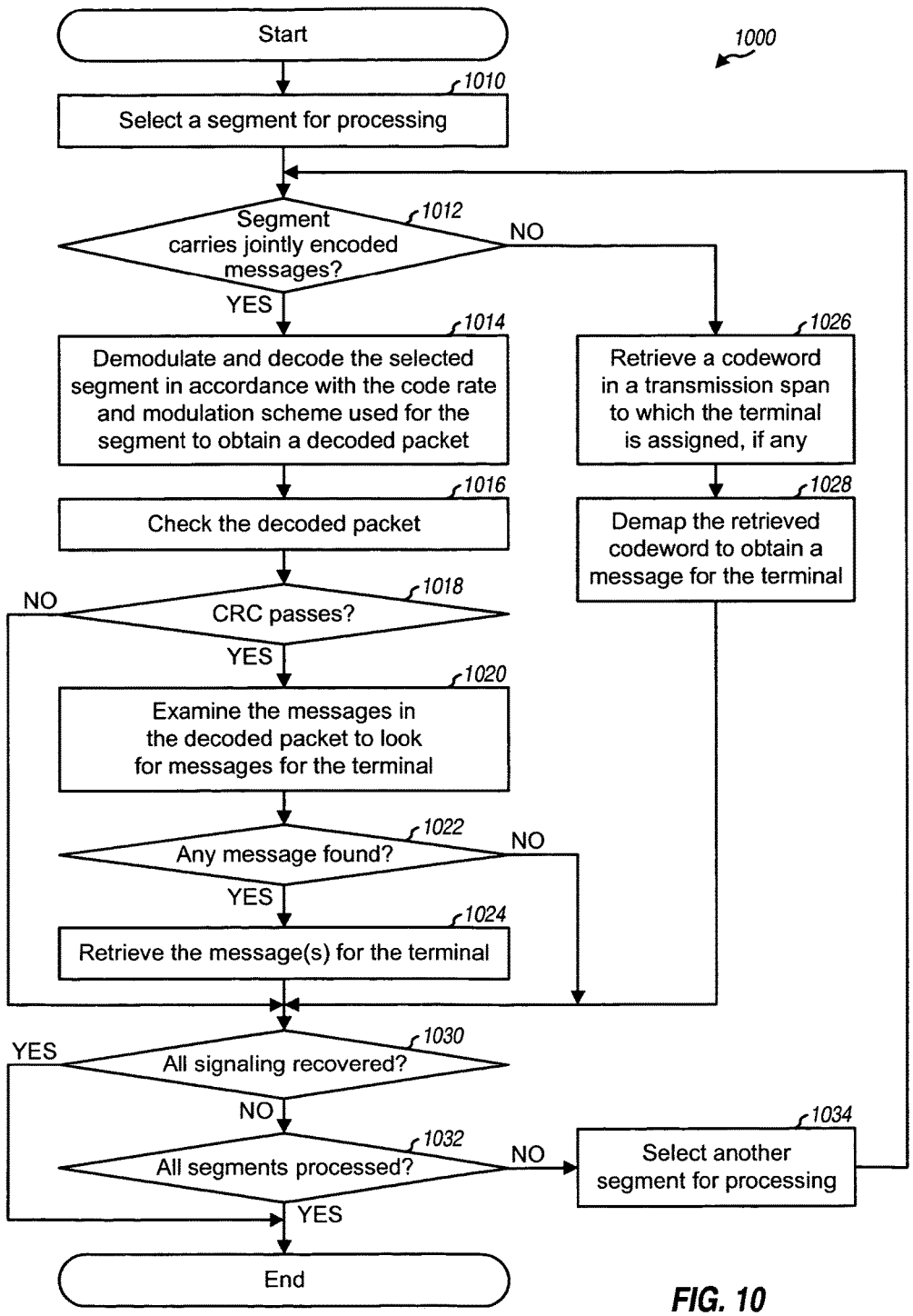
FIG. 10 shows a process to receive signaling from the shared signaling channel.

FIG. 10 shows a process 1000 performed by a terminal to receive signaling from the shared signaling channel. The terminal obtains received symbols for the segments of the shared signaling channel and selects a segment for processing (block 1010). A determination is then made whether the selected segment carries jointly encoded messages (block 1012). If the answer is 'Yes', then the received symbols for the selected segment are demodulated and decoded in accordance with the code rate and modulation scheme used for the segment to obtain a decoded packet (block 1014). The decoded packet is then checked with the CRC value appended in the packet (block 1016). If the CRC passes, as determined in block 1018, then the messages in the decoded packet are examined to look for messages for the terminal (block 1020). If any message for the terminal is found, as determined in block 1022, then the message(s) are retrieved (block 1024). If the CRC fails in block 1018, or if a message for the terminal is not found in block 1022, then the process proceeds to block 1030.

If the selected segment carries individually encoded messages, as determined in block 1012, then a codeword in a transmission span to which the terminal is assigned, if any, is retrieved (block 1026). The retrieved codeword is demapped to obtain a message for the terminal (block 1028). The process then proceeds to block 1030. In general, the selected segment is processed in a manner complementary to the processing performed by the base station for that segment.

In block 1030, a determination is made whether all signaling for the terminal has been recovered. If the answer is 'No', then a determination is made whether all segments have been processed (block 1032). If the answer is also 'No', then another unprocessed segment is selected for processing (block 1034). The process then returns to block 1012 to process the newly selected segment. The terminal may receive different types of signaling on different segments, e.g., a resource assignment message on one segment, an ACK on another segment, and so on. If all signaling for the terminal has been recovered, as determined in block 1030, or all segments have been processed, as determined in block 1032, then the process terminates.

Figure 11:
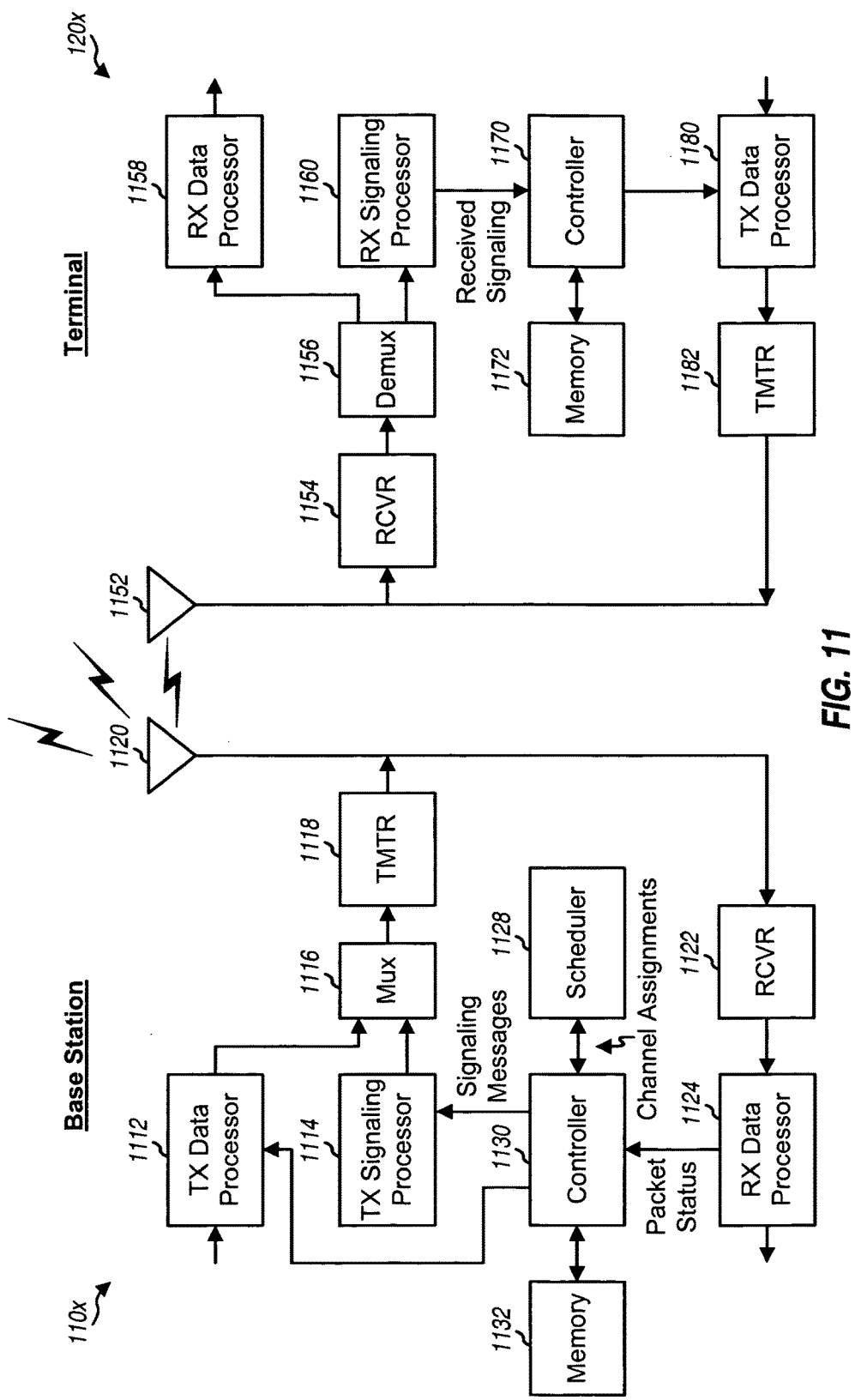
FIG. 11 shows a block diagram of the base station and the terminal.

FIG. 11 shows a block diagram of a base station 100x and a terminal 120x, which are one of the base stations and terminals in FIG. 1. For the forward link, at base station 110x, a TX data processor 1112 receives traffic data for all terminals scheduled for forward link transmission, processes the traffic data for each terminal based on a coding and modulation scheme selected for that terminal, and provides data symbols for each terminal. A TX signaling processor 1114 receives signaling messages for all terminals within the coverage of base station 110x, processes these messages for transmission on the shared signaling channel, and provides output data for the shared signaling channel. TX signaling processor 1114 may be implemented as shown in FIG. 3, 4, or 6. A multiplexer 1116 multiplexes the data symbols from processor 1112, the output data from processor 1114, and pilot symbols. A transmitter unit (TMTR) 118 performs OFDM modulation for an OFDMA system and further performs signal conditioning (e.g., analog conversion, filtering, amplification, and frequency upconversion) to generate a modulated signal, which is transmitted from an antenna 1120 to terminals within the coverage of base station 100x.

At terminal 120x, the modulated signal transmitted by base station 110x is received by an antenna 1152. A receiver unit (RCVR) 1154 processes (e.g., conditions and digitizes) the received signal from antenna 1152, performs OFDM demodulation for an OFDMA system, and provides received symbols. A demultiplexer 1156 provides received symbols for traffic data to an RX data processor 1158 and provides received symbols for the shared signaling channel to an RX signaling processor 1160. RX data processor 1158 processes its received symbols and provides decoded traffic data for terminal 120x. RX signaling processor 1160 processes its received symbols and provides signaling for terminal 120x. RX signaling processor 1160 may be implemented as shown in FIG. 7.

For the reverse link, at terminal 120x, traffic data is processed by a TX data processor 1180 to generate data symbols. A transmitter unit 1182 processes the data symbols, pilot symbols, and signaling from terminal 120x for the reverse link, performs signal conditioning, and provides a modulated signal, which is transmitted from antenna 1152. At base stations 110x, the modulated signals transmitted by terminal 120x and other terminals are received by antenna 1120, conditioned and digitized by a receiver unit 1122, and processed by an RX data processor 1124 to obtain decoded traffic data and signaling for each terminal.

Controllers 1130 and 1170 direct operation at base station 110x and terminal 120x, respectively. Memory units 1132 and 1172 store program codes and data used by controllers 1130 and 1170, respectively. Scheduler 1128 schedules terminals for transmission on the forward and reverse links, allocates system resources to the scheduled terminals, and provides channel assignments. Controller 1130 receives the channel assignments from scheduler 1128 and packet status from RX data processor 1124, generates signaling messages for the terminals, determines which segment(s) to transmit in each frame, and allocates the total transmit power to the selected segment(s).

The signaling transmission and reception techniques described herein may be implemented by various means. For example, these techniques may be implemented in hardware, software, or a combination thereof. For a hardware implementation, the processing units at a base station used to process signaling for the shared signaling channel may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a terminal used to receive signaling from the shared signaling channel may also be implemented within one or more ASICs, DSPs, processors, and so on.

For a software implementation, the signaling transmission and reception techniques may be implemented with modules (e.g., procedures, functions, and so on) that perform the functions described herein. The software codes may be stored in a memory unit (e.g., memory unit 1132 or 1172 in FIG. 11) and executed by a processor (e.g., controller 1130 or 1170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a multiple-access communication system, comprising:
   a mapper operative to receive signaling for a plurality of terminals and to map signaling for each terminal to at least one segment among a plurality of segments of a signaling channel, the plurality of segments of the signaling channel are shared by the plurality of terminals, and a number of the plurality of segments of the signaling channel is variable;
   a processor operative to process signaling mapped to each segment and to generate output data for the segment; and
   a multiplexer operative to multiplex the output data for each segment onto a set of frequency subband and a set of time interval allocated for the each segment.

2. The apparatus of claim 1, further comprising:
   a controller operative to allocate total transmit power to each of the plurality of segments; and
   a transmitter unit operative to transmit the output data for each segment with transmit power allocated for the segment.

3. The apparatus of claim 2, wherein the controller is operative to allocate the total transmit power such that the plurality of segments are transmitted at different power levels.

4. The apparatus of claim 1, wherein the processor is operative to, for each segment carrying jointly encoded signaling,
generate an error detection code value for the signaling mapped to the segment, and
encode the signaling and the error detection code value for the segment to generate a coded packet for the segment.

5. The apparatus of claim 4, wherein the processor is further operative to, for each segment carrying jointly encoded signaling,
map code bits in the coded packet for the segment to modulation symbols, and scale the modulation symbols for the segment with a gain selected for the segment.

6. The apparatus of claim 1, wherein the processor is operative to, for each segment carrying individually encoded signaling,
map signaling for each terminal mapped to the segment to a codeword, and
map the codeword for each terminal onto a transmission span assigned to the terminal.

7. The apparatus of claim 1, further comprising:
a controller operative to select the at least one segment for each terminal based on channel conditions of the terminal and operating points of the plurality of segments.

8. The apparatus of claim 1, wherein the channel conditions comprise a signal-to-noise ratio.

9. The apparatus of claim 8, wherein each of the plurality of segments is associated with a fixed code rate and variable transmit power.

10. The apparatus of claim 8, wherein the signaling for each terminal comprises a system resource assignment message, an acknowledgment (ACK), power control information, or a combination thereof.

11. A method of transmitting signaling in a multiple-access communication system, comprising:
obtaining signaling for a plurality of terminals;
mapping signaling for each terminal to at least one segment among a plurality of segments of a signaling channel, the plurality of segments of the signaling channel are shared by the plurality of terminals, and a number of the plurality of segments of the signaling channel is variable;
processing signaling mapped to each segment to generate output data for the segment; and
multiplexing the output data for each segment onto a set of frequency subband and a set of time interval allocated for the each segment.

12. The method of claim 11, further comprising:
allocating total transmit power to each of the plurality of segments; and
transmitting the output data for each segment with transmit power allocated for the segment.

13. The method of claim 11, further comprising:
transmitting output data for the plurality of segments at different power levels selected for the segments.

14. The method of claim 11, wherein mapping comprises:
mapping the signaling for each terminal according to the channel conditions for each terminal.

15. The method of claim 11, wherein the processing the signaling mapped to each segment comprises
if the segment carries jointly encoded signaling,
generating an error detection code value for the signaling mapped to the segment, and
encoding the signaling and the error detection code value for the segment to generate a coded packet for the segment.

16. The method of claim 11, wherein the processing the signaling mapped to each segment comprises if the segment carries individually encoded signaling,
mapping signaling for each terminal mapped to the segment to a codeword, and
mapping the codeword for each terminal onto a transmission span assigned to the terminal.

17. An apparatus in a multiple-access communication system, comprising:
means for obtaining signaling for a plurality of terminals;
means for mapping signaling for each terminal to at least one segment among a plurality of segments of a signaling channel, the plurality of segments of the signaling channel are shared by the plurality of terminals, and a number of the plurality of segments of the signaling channel is variable;
means for processing signaling mapped to each segment to generate output data for the segment; and
means for multiplexing the output data for each segment onto a set of frequency subband allocated and a set of time interval for the each segment.

18. The apparatus of claim 17, further comprising:
means for allocating total transmit power to each of the plurality of segments; and
means for transmitting the output data for each segment with transmit power allocated for the segment.

19. The apparatus of claim 17, wherein the means for processing the signaling mapped to each segment comprises
means for, if the segment carries jointly encoded signaling, generating an error detection code value for the signaling mapped to the segment and encoding the signaling and the error detection code value for the segment to generate a coded packet for the segment.

20. The apparatus of claim 17, wherein the means for processing the signaling mapped to each segment comprises
means for, if the segment carries individually encoded signaling, mapping signaling for each terminal mapped to the segment to a codeword and mapping the codeword for each terminal onto a transmission span assigned to the terminal.

21. The apparatus of claim 17, wherein the means for mapping comprises:
means for mapping the signaling for each terminal according to the channel conditions for each terminal.

22. An apparatus in a multiple-access communication system, comprising:
a demultiplexer operative to receive a plurality of segments, each segment of the plurality of segments are multiplexed on a set of frequency subband and a set of time interval allocated to the each segment of the plurality of segments, the plurality of segments of a signaling channel carrying signaling for a plurality of terminals, wherein signaling for a terminal is sent on at least one segment among the plurality of segments and a number of the plurality of segments is variable, and wherein the plurality of segments of the signaling channel are shared by the plurality of terminals;
a controller operative to select one of the plurality of segments for recovery;
a processor operative to process the selected segment to recover signaling sent in the segment; and a detector operative to determine whether signaling for the terminal is sent in the selected segment.

23. The apparatus of claim 22, wherein the controller is operative to select one segment at a time for processing until all signaling for the terminal is recovered, or all segments have been processed, or all unprocessed segments require higher signal-to-interference-and-noise ratios (SNRs) for recovery.

24. The apparatus of claim 22, wherein the processor is operative to decode the selected segment based on a coding scheme used for the segment and to determine whether the selected segment is decoded correctly based on an error detection code value included in the segment.

25. The apparatus of claim 22, wherein the processor is operative to obtain a received codeword from a transmission span for the terminal and to demap the received codeword to obtain a message for the terminal.

26. A method of receiving signaling at a terminal in a multiple-access communication system, comprising:
   receiving a plurality of segments, each segment of the plurality of segments are multiplexed on a set of frequency subband and a set of time interval allocated to the each segment of the plurality of segments, the plurality of segments of a signaling channel carrying signaling for a plurality of terminals, wherein signaling for the terminal is sent on at least one segment among the plurality of segments and a number of the plurality of segments is variable, and wherein the plurality of segments of the signaling channel are shared by the plurality of terminals;
   selecting one of the plurality of segments for recovery;
   processing the selected segment to recover signaling sent in the segment; and determining whether signaling for the terminal is sent in the selected segment.

27. The method of claim 26, further comprising:
   repeating the selecting one of the plurality of segments, the processing the selected segment, and the determining whether signaling for the terminal is sent in the selected segment until all signaling for the terminal is recovered, or all of the plurality of segments have been processed, or all unprocessed segments require higher signal-to-interference-and-noise ratios (SNRs) for recovery.

28. The method of claim 26, wherein the processing the selected segment comprises
   decoding the selected segment based on a coding scheme used for the segment, and
   determining whether the selected segment is decoded correctly based on an error detection code value included in the segment.

29. The method of claim 26, wherein the processing the selected segment comprises
   obtaining a received codeword from a transmission span for the terminal, and
   demapping the received codeword to obtain a message for the terminal.

30. An apparatus in a multiple-access communication system, comprising:
   means for receiving a plurality of segments, each segment of the plurality of segments are multiplexed on a set of frequency subbands and a set of time intervals allocated to the each segment of the plurality of segments, the plurality of segments of a signaling channel carrying signaling for a plurality of terminals, wherein signaling for a terminal is sent on at least one segment among the plurality of segments and a number of the plurality of segments is variable, and wherein the plurality of segments of the signaling channel are shared by the plurality of terminals;
   means for selecting one of the plurality of segments for recovery;
   means for processing the selected segment to recover signaling sent in the segment; and
   means for determining whether signaling for the terminal is sent in the selected segment.

31. The apparatus of claim 30, further comprising:
   means for selecting one segment at a time for processing until all signaling for the terminal is recovered, or all segments have been processed, or all unprocessed segments require higher signal-to-interference-and-noise ratios (SNRs) for recovery.

32. The apparatus of claim 30, wherein the means for processing the selected segment comprises
   means for decoding the selected segment based on a coding scheme used for the segment, and
   means for determining whether the selected segment is decoded correctly based on an error detection code value included in the segment.

33. The apparatus of claim 30, wherein the means for processing the selected segment comprises
   means for obtaining a received codeword from a transmission span for the terminal, and
   means for demapping the received codeword to obtain a message for the terminal.

34. The apparatus of claim 1, wherein the plurality of segments are in decreasing SNR order and a first transmitted segment also carries information for a subsequent segment.

35. The apparatus of claim 1, wherein the plurality of segments are in increasing SNR order and terminate the processing of the shared signaling channel upon encountering a decoding error for a segment.

* * * * *